June 7, 1960 L. H. VINSON 2,939,384
COLLAPSIBLE GRILL FOR SPIT OF BRAZIER
Filed Nov. 17, 1958

INVENTOR.
LAURELL H. VINSON

BY Fulwider, Mattingly
and Huntley
ATTORNEYS

United States Patent Office 2,939,384
Patented June 7, 1960

2,939,384
COLLAPSIBLE GRILL FOR SPIT OF BRAZIER

Laurell H. Vinson, 2314 Hopkins, San Diego, Calif.

Filed Nov. 17, 1958, Ser. No. 774,350

3 Claims. (Cl. 99—421)

The present invention relates to grills for braziers and particularly to a collapsible type grill, and also relates to a brazier which can support spits and yet is collapsible.

In practicing the present invention, I provide a rectangularly shaped frame including a plurality of frame members, hinged to one another so that they can be collapsed into side by side adjacent relationship.

Opposite, parallelly arranged frame members are notched to provide sockets for receiving bars or rods which may be used for supporting meat laid across a plurality of these bars and also may be used individually as spits which are adapted to be rotated.

In one aspect of the present invention, the sides of the frame are each formed of two frame members which have adjacent ends thereof hingedly connected with one another. The other ends of these side frame members are hingedly connected, respectively, with the front and rear frame member.

In another aspect of the invention, either the front or the rear frame member includes end portions extending toward the other parallelly arranged frame member and one of the side frame members is hingedly attached to the end of one of the extended portions, and one of the opposite side members is hingedly attached to the end of the other extended portion. In so doing a space remains between frame members after the grill is fully collapsed, and this space is utilized for storing the bars or spits when the grill is not in use.

One of the frame members, and preferably the front frame member rotatably supports two sprockets. An endless chain is trained about these sprockets for rotating the spits. In the preferred embodiment, each spit has a sprocket firmly attached thereto and is rotated by rotation of the sprocket thereon. These spit-carried sprockets are arranged so as to be driven by the chain.

Further objects and advantages will be apparent from the following description, reference being had to the accompanying drawings wherein a preferred embodiment of the invention is illustrated.

Figure 1:
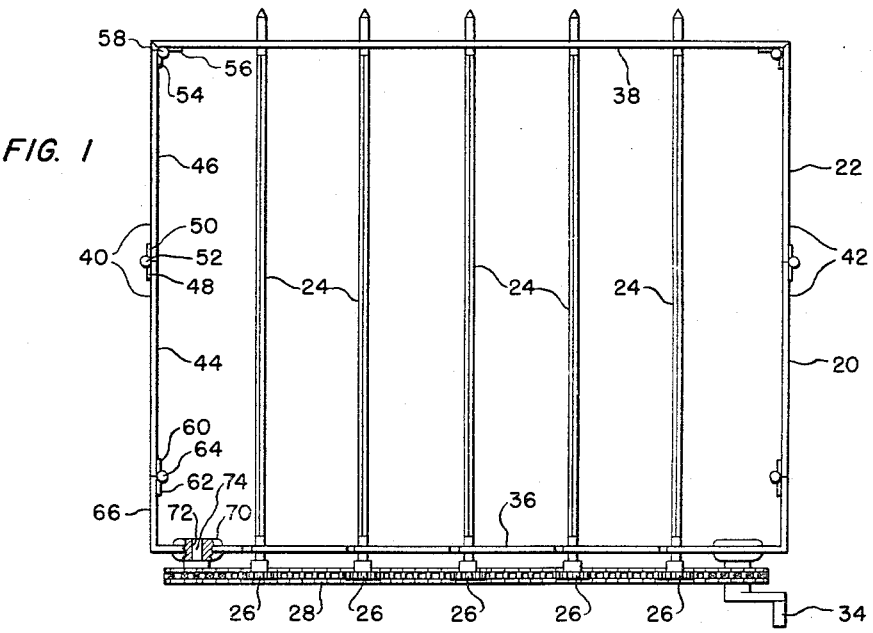
Fig. 1 is a top plan view of the improved grill.
Figure 2:
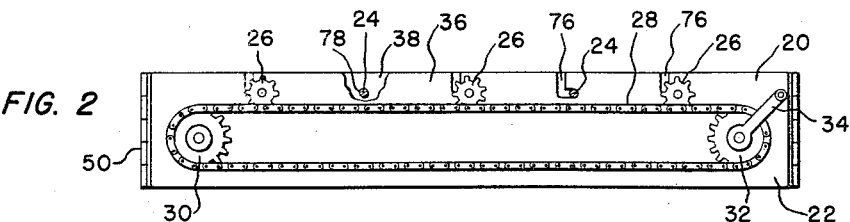
Fig. 2 is a front view of the grill shown in Fig. 1 parts thereof being broken away for the purpose of showing certain bearings.

Referring in detail to the drawings, the grill is shown generally at 20 and includes a rectangularly shaped frame 22 which supports a plurality of rods or bars 24. A plurality of these rods may be used to support a slab or chop of meat, or the rods may function as spits which are individually rotated through sprockets 26. The sprockets 26 are turned through an endless chain 28 which is trained about two sprockets 30 and 32. One of these sprockets 30 or 32 is the driving sprocket and may be actuated in any manner such as by an electric motor or by a crank as shown at 34.

In detail the frame 22 is preferably rectangular in shape and may be supported by a stand or placed directly over a fire pit. The frame includes a front frame member 36, a parallelly arranged rear frame member 38 and side frame means 40 and 42. The side frame means 40 and 42 each include a frame member 44 and a frame member 46. The confronting ends of the frame members 44 and 46 carry hinge leaves 48 and 50 respectively. These hinge leaves may be welded or riveted to the members 44 and 46. The hinge leaves are provided with aligned loops (not shown) for receiving a hinge pin 52. These hinge leaves and pins are of standard construction. The rear ends of frame members 46 each carries a hinge leaf 54, and the opposite ends of the frame member 38 carry a cooperating hinge leaf 56 and these leaves are provided with aligned loops (not shown), for receiving a hinge pin 58. The front ends of frame members 44 each carries a hinge leaf 60 which cooperates with hinge leaf 62 on the front frame member 36. These hinge leaves also are provided with aligned loops which receive hinge pin 64.

Figure 3:
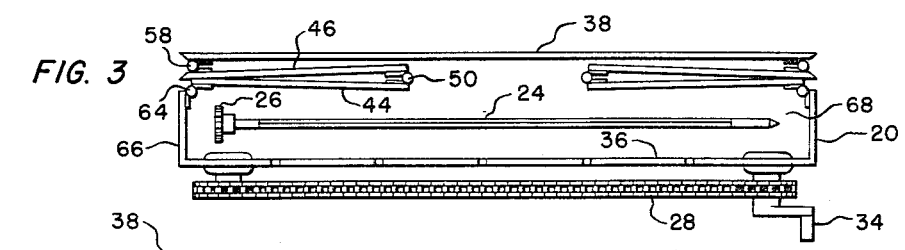
Fig. 3 is a top plan view of the grill, showing the same in collapsed position.
Figure 4:
Fig. 4 is a fragmentary view showing the grill partly collapsed, the view being on a larger scale.
Figure 4:
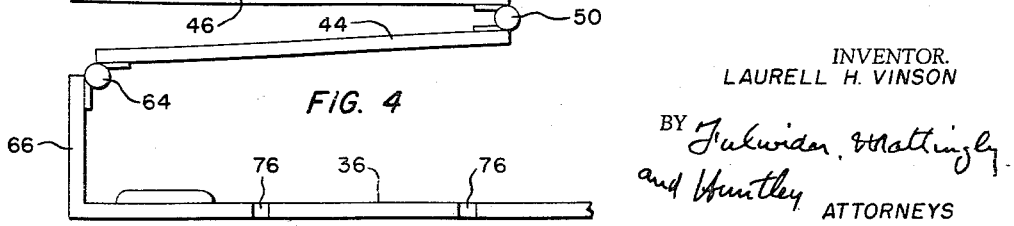

It will be observed that the front frame member 36 is provided with rearwardly extending portions 66. The hinge leaves 62 are carried at the rear ends of the portion 66. After the rods or spits 24 are removed, the frame 22 can be readily collapsed by pushing the side frame means toward one another, as is more clearly shown in Fig. 4. Fig. 3 shows the fully collapsed position of the frame 22. It will be observed that by reason of the extended portion 66, a space 68 is provided between the front frame member 36 and the frame members 44 and the rear frame member 38 for receiving the spits with the sprockets 26 attached thereto. Thus the frame can be collapsed to occupy a small area and also provides storage space for the spits and sprockets on the spits.

Referring more in detail to the driving mechanism, the front frame is provided with widened portions 70 which are drilled to provide bearing surfaces 72 for shafts 74. These shafts carry sprockets 30 and 32. The upper part of the front frame member 36 is provided with a plurality of notches or slots 76 for receiving the spits 24 and for providing bearings therefor. Preferably these slots extend downwardly and then horizontally, the upper horizontal wall of the horizontal slot portion providing a shoulder for preventing displacement of the spits when the sprocket is being rotated counterclockwise by the chain. Similar slots may be provided in the rear wall 38 for the spits 24 or this wall may be provided with bearing holes 78. The bars, rods or spits 24 are cylindrically shaped at the fronts and rears thereof where they ride on the bearings but are preferably non-cylindrical intermediate the cylindrical portions for preventing turning relative to the meats thereon.

From the foregoing it will be seen that after the rods or spits 24 are removed by merely lifting upwardly thereon and then pulling forwardly, the frame 22 can then be collapsed; thereafter the rods and sprockets, which are fastened thereto, can be stored in the space 68.

While the form of embodiment herein shown and described constitutes a preferred form, it is to be understood that other forms may be adopted falling within the scope of the claims that follow.

I claim:

1. A collapsible grill for a brazier comprising a front frame member; a rear frame member, spaced from and disposed parallelly of the front frame member, one of said frame members having portions at opposite ends thereof extending toward the other frame member; opposite side frame means, each side frame means including two frame members having adjacent ends hingedly connected with one another, the other end of one of said side frame members being hingedly connected with the extended end of one of the portions of one of the parallelly arranged frame members, and the other end of the other side frame member being hingedly connected with the other of the parallelly arranged frame members, certain opposite frame members having bearings; and bars carried by said bearings.

2. A collapsible grill for a brazier comprising a front frame member; a rear frame member, spaced from and disposed parallelly of the front frame member, one of said frame members having portions at opposite ends thereof extending toward the other frame member; opposite side frame means, each side frame means including two frame members having adjacent ends hingedly connected with one another, the other end of one of said side frame members being hingedly connected with the extended end of one of the portions of one of the parallely arranged frame members, and the other end of the other side frame member being hingedly connected with the other of the parallelly arranged frame members, certain opposite frame members having sockets; spits carried by said bearings, one of said opposite frame members having bearings adjacent the ends thereof; sprockets carried by the second mentioned bearings; and driving connections between the sprockets and spits.

3. A collapsible grill for a brazier comprising a front frame member; a rear frame member, spaced from and disposed parallelly of the front frame member, one of said frame members having portions at opposite ends thereof extending toward the other frame member; opposite side frame means, each side frame means including two frame members having adjacent ends hingedly connected with one another, the other end of one of said side frame members being hingedly connected with the extended end of one of the portions of one of the parallelly arranged frame members, and the other end of the other side frame member being hingedly connected with the other of the parallelly arranged frame members, certain opposite frame members having bearings; spits carried by said bearings, one of said opposite frame members having bearings adjacent the ends thereof; sprockets carried by the second mentioned bearings; and endless chain trained about said sprockets; and rotatable driving mechanism on said spits and disposed in driven relationship with the chain.

References Cited in the file of this patent

UNITED STATES PATENTS

| | | |
|---|---|---|
| 902,724 | Giovana | Nov. 3, 1908 |
| 1,134,343 | Mago | Apr. 6, 1915 |
| 1,212,162 | Green | Jan. 9, 1917 |
| 2,576,750 | Clark | Nov. 27, 1951 |

FOREIGN PATENTS

| | | |
|---|---|---|
| 308,104 | Great Britain | Mar. 21, 1929 |